United States Patent Office 2,752,404
Patented June 26, 1956

2,752,404

PROCESS OF PRODUCING INDANES FROM PARA-CYMENE

Ernest H. Polak, Middletown, N. Y., assignor to Polak's Frutal Works, Inc.

No Drawing. Application October 9, 1953, Serial No. 385,261

11 Claims. (Cl. 260—668)

This invention relates to the production of poly alkyl indanes from p-cymene. All percentages and parts herein are on a weight basis.

I have made the surprising and unexpected discovery that by reacting certain secondary and tertiary alcohols or alkenes containing from 4 to 12, preferably from 4 to 9, carbon atoms with p-cymene employing from 2 to 3 mols of p-cymene per mol of alcohol or alkene and in the presence of a liquid medium consisting of from 85% to 93% sulfuric acid and from 7% to 15% water at a temperature of from $-20°$ to $50°$ C. a poly alkyl indane or a mixture of poly alkyl indanes results. The alkenes should have the structural Formula I noted below, or should have a structure such that it rearranges by shifting of the double bond to have this structural formula Formula I: 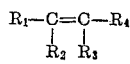

in which $R_1$ and $R_2$ are alkyl groups containing from 1 to 9, preferably 1 to 6, carbon atoms, $R_3$ and $R_4$ are either hydrogen or alkyl groups containing from 1 to 8, preferably 1 to 5, carbon atoms, $R_3$ could be hydrogen and $R_4$ an alkyl group, or vice versa. The alcohols should be of the type that will split off water to form either an alkene having structural Formula I noted above, or an alkene which upon rearrangement has this structural formula. For example, in the case of methyl isobutyl carbinol (Formula II below) it dehydrates to 4-methyl-pentene-2 (Formula III below) which rearranges to 4-methyl-pentene-3 (Formula IV below) which can react with p-cymene to form an indane.

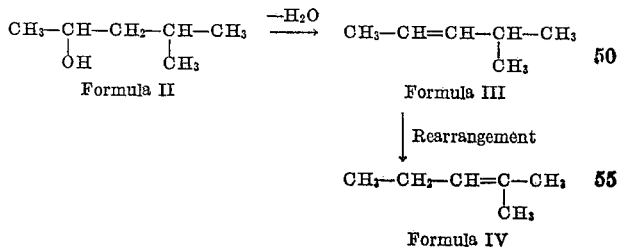

The presence of at least 7% water is essential; if less water is used the desired indanes are not produced in appreciable yields. The reaction desirably is carried out under atmospheric pressure conditions.

Thus, in accordance with my invention, p-cymene is reacted with tertiary amyl alcohol or tertiary amylene, employing from 2 to 3 mols of p-cymene per mol of alcohol or alkene and in the presence of from 85% to 93% sulfuric acid and from 7% to 15% water at a temperature of from $-20°$ to $50°$ C., preferably $-10°$ to $20°$ C., when using the alcohol, or at a temperature of $0°$ to $50°$ when employing tertiary amylene, producing a mixture of 1,1,2,3,3,5 hexamethyl indane, 1,1,3,5 tetramethyl-3-ethyl indane and 1,1,3,3,5 pentamethyl indane. The substitution of corresponding secondary and tertiary alcohols or alkenes containing from 4 to 12 carbon atoms for the tertiary amyl alcohol or the tertiary amylene results in the production of corresponding indanes. Thus instead of tertiary amyl alcohol in the above reaction, one may use tertiary butanol, methyl isopropyl carbinol, methyl isobutyl carbinol, dimethyl isopropyl carbinol, methyl diethyl carbinol, dimethyl isobutyl carbinol, diisopropyl carbinol, diisobutyl carbinol, etc.

When reacting p-cymene with an alcohol from 1 to 5, preferably 1.5 to 4, parts by weight of sulfuric acid of the concentration noted are employed per part of p-cymene. When the reaction is carried out with an alkene, a lesser amount of sulfuric acid of the concentration noted is employed, because in this reaction none of the sulfuric acid is required to effect dehydration of the alcohol. Reacting an alkene with p-cymene from ⅛ to 2, preferably ⅛ to 1, parts of sulfuric acid of the concentration noted are used per part of p-cymene.

The indanes formed by the process of this invention are suitable for use as intermediates in producing pharmaceuticals, agricultural chemicals, dyes, odorants including musk odorants and those having a woody odor, etc. Thus, for example, by acetylating the indanes having from 14 to 16 carbon atoms, desirably at a temperature within the range of $0°$ to $60°$ C., preferably $10°$ to $30°$ C., corresponding ketones are produced of pronounced musk odors. The acetylation may be effected by treating the individual indane or mixture thereof with acetyl chloride in the presence of aluminum chloride or other Friedel-Crafts catalyst.

Of the indanes above mentioned the methyl ketone derivative of 1,1,2,3,3,5 hexamethyl indane has the most pronounced musk odor. This methyl ketone derivative may be termed 1,1,2,3,3,5 hexamethyl indane-methyl ketone. The methyl ketone derivative of 1,1,3,3,5 pentamethyl indane has a woody odor and can be used for the production of odoriferous materials, where such odor is desired. The mixture of indanes hereinabove identified may be acetylated to produce a mixture of methyl ketone derivatives having a strong musk odor.

While the exact mechanism of the reaction is not fully understood it is believed that in the presence of the liquid medium containing from 7% to 15% water, the rest being sulfuric acid, hydrogen or hydrogen and a methyl group splits off from the alkylated cymene produced by the reaction of the p-cymene with the secondary or tertiary alcohol or alkene and ring closure also takes place with formation of the indane homologs. The reaction between p-cymene and tertiary amyl alcohol may be represented as follows:

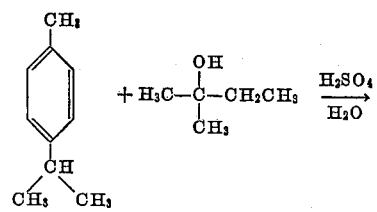

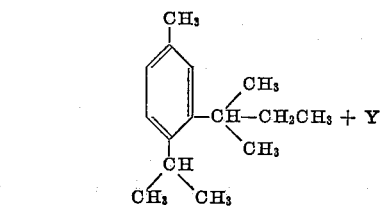

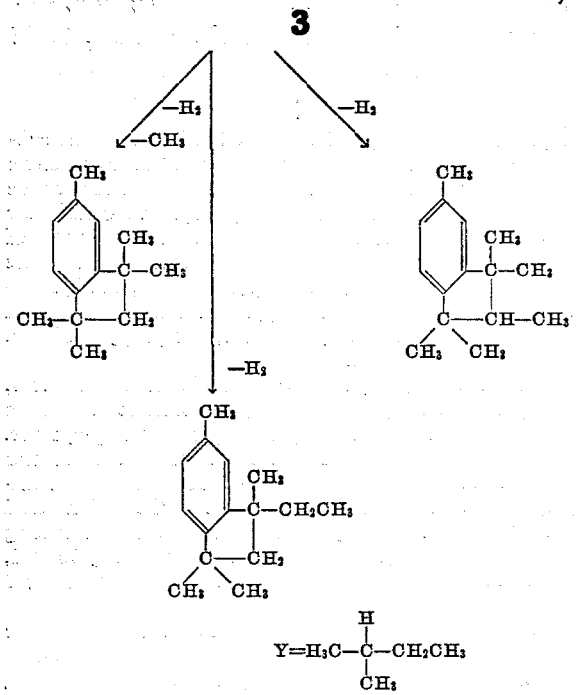

Proof of the indane structure was confirmed by synthesizing the indane compounds by conventional and recognized reactions and comparing the properties of the resultant compounds with those produced by the process of this invention. The properties were found to be identical. Also analysis of the chemical composition checks with the indane formulas. Furthermore, the fact that hydrogen is split off during the reaction is confirmed by the fact that isopentane can be isolated from the lower boiling fractions of the reaction product in an amount approximately equal to half the tertiary amyl alcohol or tertiary amylene reacted. The isopentane is derived from the addition of hydrogen to the tertiary amylene which is either already present or has been formed from the tertiary amyl alcohol by the dehydrating action of the sulfuric acid catalyst. The formation of approximately a half a mol of isopentane in the reaction product is explained by the following equation:

1 mol p-cymene + 1 mol t-amyl alcohol (or 1 mol t-amylene) → 0.5 mol p-cymene + 0.5 mol isopentane + 0.5 mol indane isomers.

The following examples are given for purposes of illustration only; it will be understood the invention is not limited to these examples. In all of the examples the equipment used as a flask equipped with a thermometer, stirrer or agitator, a dropping funnel and a gas exhaust tube.

The number of parts of sulfuric acid given in the examples is on a basis of sulfuric acid of 100% concentration. It will be understood that somewhat weaker acid, say 96% acid, may be used in which case the number of parts of water added is adjusted to take into account the water present in the sulfuric acid.

EXAMPLE I

A mixture of 500 grams p-cymene and 125 grams tertiary amyl alcohol are added to a solution cooled to a temperature of −10° C. in the flask, which solution contained 1286.4 grams of sulfuric acid and 113.6 grams of water. The mixture is added over a 2 hour period, care being taken that the temperature of the mixture does not rise appreciably over −5° C. After completion of the addition of the p-cymene-amyl alcohol mixture, the reaction mixture is stirred for 5 hours allowing the temperature to rise to 10° C. The colorless oil layer is separated in a separatory funnel and washed with aqueous dilute sodium hydroxide and water until neutral. The neutral oil is then distilled under vacuum; a forerun of unreacted p-cymene and isopentane is first distilled over followed by the desired reaction product as a colorless liquid boiling at a temperature of 103° at 7 mm. of mercury. Its density at 15° C. is 0.906–0.908. It consists of a mixture of about 45% 1,1,2,3,3,5 hexamethyl indane, about 25% 1,1,3,5 tetramethyl-3-ethyl indane and about 15% 1,1,3,3,5 pentamethyl indane, the rest being alkylated cymenes and other reaction products. Any individual indanes may be isolated by fractional distillation, preferably under vacuum. The properties of the indanes are given in the following Table 1.

Table 1

| Name | Formula | Boiling Point at 2 mm. Hg | $n_D^{20}$ | $d_4^{20}$ | $MR_D^{20}$ found | $MR_D^{20}$ calc. | Elementary Analysis | | U. V. Spectrum, peak wave length in m$\mu$ | $\epsilon$ |
|---|---|---|---|---|---|---|---|---|---|---|
| | | | | | | | Percent C, Percent H found | Percent C, Percent H calc. | | |
| 1,1,2,3,3,5 hexamethyl-indane | $C_{15}H_{22}$ | °C. 85 | 1.5119 | 0.9119 | 66.57 | 66.83 | 89.23 / 10.80 | 89.04 / 10.96 | 275,4 / 269,75 / 267,2 / 262,25 | 1590 / 1275 / 880 |
| 1,1,3,5 tetramethyl-3-ethyl indane | $C_{15}H_{22}$ | 79½ | 1.5049 | 0.8995 | 66.55 | 66.83 | 89.11 / 11.00 | 89.04 / 10.96 | 276,1 / 269,8 / 268,3 / 262,8 | 1440 / 1260 / 870 |
| 1,1,3,3,5 pentamethyl indane | $C_{14}H_{20}$ | 68 | 1.5019 | 0.8911 | 62.34 | 62.18 | 89.26 / 10.89 | 89.36 / 10.64 | 275,8 / 270,25 / 267,5 / 262,4 | 1840 / 1430 / 990 |

The mixture of poly alkyl indanes or the individual poly alkyl indanes may be converted into the corresponding ketones by reaction with acetyl chloride in the presence of anhydrous aluminum chloride catalyst. Thus, 400 grams of pure nitrobenzene and 140 grams of anhydrous aluminum chloride are agitated in the flask until complete dissolution takes place. The flask is cooled with water to maintain it at a temperature below 30° C. 200 grams indane product produced as described above and 85 grams of acetyl chloride are slowly added to the nitrobenzene-aluminum chloride mixture by means of the dropping funnel over a 3 hour period. During the reaction the temperature is kept at about 20° C. by cooling with water. When the gas evolution ceases the reaction mixture is stirred for an additional half hour. The thick liquid mass thus produced is poured into ice water while vigorously stirring and the stirring is continued while adding hydrochloric acid until the complex compound of the aluminum chloride is completely decomposed. The resultant heavy yellow oil is extracted with benzene and washed with water and sodium acetate solution until neutral. After distilling off the solvent 640 grams of a mixture of nitrobenzene with the ketone are obtained from which the nitrobenzene can easily be separated by repeated distillation under vacuum. About 200 grams of pure idane methyl ketone product are obtained. The properties of the indane methyl ketones are given in Table 2 which follows:

of colorless liquid which has a refractive index of $N_D^{20}$ 1.4979–1.4985. The resultant mixture of indanes may Table 2

| Name | Formula | Boiling Point at 2 mm. Hg | $n_D^{20}$ | °C. Melting Point | Elementary Analysis | | °C.M.P. semi-carbazone | °C. M. P. 2,4 dinitro phenyl-hydrazon |
|---|---|---|---|---|---|---|---|---|
| | | | | | Percent C, Percent H found | Percent C, Percent H calc. | | |
| 1,1,2,3,3,5 hexamethyl-indane-methyl ketone | $C_{17}H_{24}O$ | °C. 131 | 1.5322 | 58–59 | 83.46 9.73 | 83.54 9.89 | 196–198 | 162½–164½ yellow. |
| 1,1,3,5 tetramethyl-3-ethyl indane methyl ketone | $C_{17}H_{24}O$ | 117 | 1.5285 | 31–32 | 83.22 9.66 | 83.54 9.89 | 168–170 | 141–142½. |
| 1,1,3,3,5 pentamethyl indane methyl ketone | $C_{16}H_{22}O$ | 117 | 1.5228 | 59–60 | 83.66 9.65 | 83.43 9.62 | 181–183 | 178–180 red. 159–161½ yellow. |

EXAMPLE II

A mixture of 710 grams of p-cymene and 200 grams of methyl-isobutyl-carbinol are added drop-wise while vigorously stirring over a 5 hour period, care being taken that the temperature of the reaction mixture does not rise above 15° C., to a liquid solution in the flask. The solution contains 1860 grams of sulfuric acid and 140 grams of water and had previously been cooled to 10° C. After completion of the addition the reaction mixture is stirred for 4 hours more at approximately 20° C. The colorless oil layer is separated in a separatory funnel and washed with dilute acqueous sodium hydroxide and water until neutral. The resultant liquid is distilled under vacuum. A forerun of unreacted p-cymene and pentane is distilled over first followed by a mixture of indanes at a constant temperature of 95° C. at 1.5 mm. of mercury in the form of a colorless liquid which has a refractive index $N_D^{20}$ of 1.5035–1.5060. The resultant mixture of indanes may be acetylated in the same manner as described in Example I.

EXAMPLE III

A mixture of 800 grams p-cymene and 160 grams tertiary butyl alcohol are added, dropwise, while stirring over a 3 hour period, care being taken that the reaction temperature remains between −10° and 0° C., to a liquid solution containing 1840 grams of sulfuric acid and 160 grams of water. After completion of the addition, the reaction mixture is stirred for 2 hours at 0° C. while cooling externally, followed by additional stirring for 2 hours without external cooling so that the temperature rises to 15° to 20° C. The oil layer is separated in a separatory funnel and washed with dilute aqueous sodium hydroxide and water until neutral. The resultant liquid is distilled under vacuum through an efficient fractionating column. The forerun of unreacted p-cymene is recovered followed by 132 grams of indane fraction boiling at a constant temperature of 67.5° at 2.0 mm. of mercury in the form of a colorless liquid which has a refractive index of $N_D^{20}$ of 1.5025–1.5028 and which consists principally of 1,1,3,3,5 pentamethyl indane. This product may be acetylated in the same manner as described in Example I.

EXAMPLE IV

A mixture of 875 grams of para-cymene and 360 grams of diisobutyl carbinol are added dropwise while stirring over a 3-hour period, care being taken that the temperature of the reaction mixture does not rise above 10° C., to a liquid solution in the flask containing 2110 grams of sulfuric acid and 182 grams of water. After completion of the addition, the mixture is stirred for 4 hours at 20° C. The oil layer is separated in a separatory funnel and washed with dilute aqueous sodium hydroxide and water until neutral. The resultant liquid is distilled under vacuum. A forerun of unreacted p-cymene is distilled over first followed by a mixture of indanes at a constant temperature of 118° C. at 2 mm. of mercury in the form be acetylated in the same manner as described in Example I.

It will be appreciated that mixtures of indanes including isomers result in carrying out the reaction of the above examples and that the expression "indanes" is used herein to include such mixtures.

By "poly alkyl indane," as used herein, is meant an indane having only alkyl substituents. It will be understood that the compound or compounds herein referred to as indane or indanes are also called indan or indans, respectively.

It is to be understood that this invention is not restricted to the present disclosure otherwise than as defined by the appended claims.

What is claimed is:

1. A process of producing poly alkyl indanes from para-cymene, which comprises reacting para-cymene with a compound from the group consisting of secondary and tertiary saturated aliphatic alcohols and alkenes having from 4 to 12 carbon atoms, the alkenes in turn being from the group consisting of alkenes having the formula

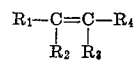

in which $R_1$ and $R_2$ are alkyl groups containing from 1 to 9 carbon atoms, $R_3$ and $R_4$ are from the group consisting of hydrogen and alkyl groups containing from 1 to 8 carbon atoms, and alkenes which rearrange to form an alkene having said formula and said alcohols are such that upon splitting off of water they form an alkene from said group of alkenes, employing from 2 to 3 mols of para-cymene per mol of said compound at a temperature within the range of −20° to 50° C. in the presence of a solution containing from 85% to 93% sulfuric acid and from 7% to 15% water.

2. A process of producing poly alkyl indanes from para-cymene, which comprises reacting para-cymene with an alcohol from the group consisting of secondary and tertiary saturated aliphatic alcohols having from 4 to 12 carbon atoms which alcohols upon splitting off of water form an alkene from the group consisting of alkenes having the formula

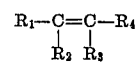

in which $R_1$ and $R_2$ are alkyl groups containing from 1 to 9 carbon atoms, $R_3$ and $R_4$ are from the group consisting of hydrogen and alkyl groups containing from 1 to 8 carbon atoms, and alkenes which rearrange to form an alkene having said formula, employing from 2 to 3 mols of para-cymene per mol of said alcohol at a temperature of from −20° to 50° C. in the presence of a solution containing from 85% to 93% sulfuric acid and from 7% to 15% water.

3. The process as defined in claim 2, in which from 1 to 5 parts by weight of sulfuric acid are employed per part of para-cymene.

4. A process of producing poly alkyl indanes from para-cymene, which comprises reacting para-cymene with an alkene from the group consisting of alkenes having the formula

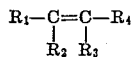

in which $R_1$ and $R_2$ are alkyl groups containing from 1 to 9 carbon atoms, $R_3$ and $R_4$ are from the group consisting of hydrogen and alkyl groups containing from 1 to 8 carbon atoms, and alkenes which rearrange to form an alkene having said formula, employing from 2 to 3 mols of para-cymene per mol of alkene at a temperature of from 0° to 50° C. in the presence of a solution containing from 85% to 93% sulfuric acid and from 7% to 15% water.

5. The process as defined in claim 4, in which from ⅛ to 2 parts by weight of sulfuric acid are employed per part of para-cymene.

6. A process of producing poly alkyl indanes from para-cymene, which comprises reacting para-cymene with an alcohol from the group consisting of tertiary butanol, methyl isopropyl carbinol, methyl isobutyl carbinol, dimethyl isopropyl carbinol, methyl diethyl carbinol, dimethyl isobutyl carbinol, diisopropyl carbinol and diisobutyl carbinol at a temperature of from −10° to 20° C. in the presence of a solution containing from 85% to 93% sulfuric acid and from 7% to 15% water.

7. A process of producing a mixture of 1,1,2,3,3,5 hexamethyl indane, 1,1,3,5 tetramethyl-3-ethyl indane and 1,1,3,3,5 pentamethyl indane, which comprises reacting paracymene with tertiary amylene employing from 2 to 3 mols of para-cymene per mol of tertiary amylene at a temperature of from −10° to 20° C. in the presence of a solution containing from 85% to 93% sulfuric acid and from 7% to 15% water.

8. A process of producing a mixture of 1,1,2,3,3,5 hexamethyl indane, 1,1,3,5 tetramethyl-3-ethyl indane and 1,1,3,3,5 pentamethyl indane, which comprises reacting para-cymene with tertiary amyl alcohol employing from 2 to 3 mols of para-cymene per mol of tertiary amyl alcohol at a temperature of from −10° to 20° C. in the presence of about 85% to 93% sulfuric acid and 7% to 15% water.

9. A process of producing 1,1,3,3,5 pentamethyl indane, which comprises reacting para-cymene with tertiary butyl alcohol employing from 2 to 3 mols of para-cymene per mol of tertiary butyl alcohol at a temperature of from −10° to 20° C. in the presence of approximately 85% to 93% sulfuric acid and 7% to 15% water utilizing from 1.5 to 4 parts by weight of said acid per part of para-cymene.

10. A process of producing poly alkyl indanes from para-cymene, which comprises reacting para-cymene with an alcohol from the group consisting of secondary and tertiary saturated aliphatic alcohols containing 6 carbon atoms, which alcohol upon splitting off of water forms an alkene having the formula

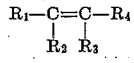

in which $R_1$ and $R_2$ are alkyl groups containing from 1 to 3 carbon atoms and $R_3$ and $R_4$ are from the group consisting of hydrogen and alkyl groups containing from 1 to 2 carbon atoms, employing from 2 to 3 mols of para-cymene per mol of said alcohol at a temperature within the range of from −20° to 50° C. in the presence of a solution containing from 85% to 93% sulfuric acid and from 7% to 15% water.

11. A process of producing poly alkyl indanes from para-cymene, which comprises reacting para-cymene with methyl-isobutyl-carbinol in the proportions of from 2 to 3 mols of para-cymene per mol of said methyl-isobutyl-carbinol at a temperature of from −20° to 50° C. in the presence of a solution containing from 85% to 93% sulfuric acid and from 7% to 15% water.

References Cited in the file of this patent

UNITED STATES PATENTS

| | | |
|---|---|---|
| 1,951,123 | Barbier | Mar. 13, 1934 |
| 2,587,577 | Ipatieff et al. | Mar. 4, 1952 |

OTHER REFERENCES

Ipatieff et al.: "Jour. Am. Chem. Soc.," vol. 70, 1948, pages 2123–28.